(12) United States Patent
Ramsey et al.

(10) Patent No.: US 7,881,959 B2
(45) Date of Patent: *Feb. 1, 2011

(54) ON DEMAND SELECTION OF MARKETING OFFERS IN RESPONSE TO INBOUND COMMUNICATIONS

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1417 days.

This patent is subject to a terminal disclaimer.

(21) Appl. No.: 11/121,215

(22) Filed: May 3, 2005

(65) Prior Publication Data

US 2006/0253309 A1    Nov. 9, 2006

(51) Int. Cl.
*G06Q 10/00* (2006.01)
(52) U.S. Cl. ............................... 705/10; 705/8
(58) Field of Classification Search .................. None
See application file for complete search history.

(56) References Cited

U.S. PATENT DOCUMENTS

| | | | |
|---|---|---|---|
| 5,930,764 | A | 7/1999 | Melchione et al. |
| 5,966,695 | A | 10/1999 | Melchione et al. |
| 6,067,525 | A | 5/2000 | Johnson et al. |
| 6,233,566 | B1 | 5/2001 | Levine et al. |
| 6,236,977 | B1 | 5/2001 | Verba et al. |
| 6,427,140 | B1 | 7/2002 | Ginter et al. |
| 6,484,163 | B1 | 11/2002 | Lawrence et al. |
| 6,519,571 | B1 | 2/2003 | Guheen et al. |
| 6,567,786 | B1 | 5/2003 | Bibelnieks et al. |
| 6,839,680 | B1 | 1/2005 | Liu et al. |
| 6,847,934 | B1 | 1/2005 | Lin et al. |
| 6,882,985 | B1 * | 4/2005 | Kay et al. ............... 705/37 |
| 6,895,405 | B1 | 5/2005 | Choi et al. |

(Continued)

FOREIGN PATENT DOCUMENTS

WO    WO 9922328 A1    5/1999

(Continued)

OTHER PUBLICATIONS

Dwyer Robert. F, "Customer lifetime valuation to support marketing decision making," Journal of Direct marketing, vol. 11 No. 4 Fall 1997 pp. 6-13.*

(Continued)

*Primary Examiner*—Jonathan G. Sterrett
*Assistant Examiner*—Tzu-Hsiang (Sean) Lan
(74) *Attorney, Agent, or Firm*—Schmeiser, Olsen & Watts; Anna L. Linne (57) ABSTRACT

A database system and method for ordering on demand a plurality of marketing offers for offering to a candidate in response to an inbound communication from the candidate. The database system comprises a first database structure storing a first list identifying marketing offers, a second database structure storing a second list of candidates, and a database manager software application stored on a computer readable medium. The database manager software application comprises an on demand optimization tool. The on demand optimization tool is for optimizing and sorting, the marketing offers from the first list with for a first candidate from the second list in response to an inbound communication from the first candidate.

28 Claims, 3 Drawing Sheets

U.S. PATENT DOCUMENTS

| | | | |
|---|---|---|---|
| 6,925,441 B1* | 8/2005 | Jones et al. | 705/10 |
| 6,934,714 B2* | 8/2005 | Meinig | 707/102 |
| 6,993,493 B1 | 1/2006 | Galperin et al. | |
| 7,007,088 B1* | 2/2006 | Najmi | 709/225 |
| 7,020,631 B2 | 3/2006 | Freeman et al. | |
| 7,133,834 B1* | 11/2006 | Abelow | 705/10 |
| 7,194,448 B2* | 3/2007 | Luth et al. | 707/1 |
| 7,216,109 B1* | 5/2007 | Donner | 705/64 |
| 7,222,078 B2* | 5/2007 | Abelow | 705/1 |
| 7,272,575 B2 | 9/2007 | Vega | |
| 7,280,975 B1* | 10/2007 | Donner | 705/10 |
| 7,349,865 B2 | 3/2008 | Fergusson et al. | |
| 7,364,068 B1* | 4/2008 | Strubbe et al. | 235/376 |
| 7,386,517 B1* | 6/2008 | Donner | 705/75 |
| 7,392,222 B1* | 6/2008 | Hamilton et al. | 705/39 |
| 2001/0014868 A1 | 8/2001 | Herz et al. | |
| 2001/0037212 A1* | 11/2001 | Motosuna et al. | 705/1 |
| 2002/0004735 A1 | 1/2002 | Gross | |
| 2002/0007313 A1* | 1/2002 | Mai et al. | 705/14 |
| 2002/0026356 A1* | 2/2002 | Bergh et al. | 705/14 |
| 2002/0040352 A1* | 4/2002 | McCormick | 705/80 |
| 2002/0062247 A1 | 5/2002 | Allen | |
| 2002/0062249 A1 | 5/2002 | Iannacci | |
| 2002/0147670 A1 | 10/2002 | Lange | |
| 2002/0165771 A1* | 11/2002 | Walker et al. | 705/14 |
| 2002/0198775 A1 | 12/2002 | Ryan | |
| 2003/0028451 A1 | 2/2003 | Ananian | |
| 2003/0046222 A1* | 3/2003 | Bard et al. | 705/38 |
| 2003/0083936 A1 | 5/2003 | Mueller et al. | |
| 2003/0084053 A1 | 5/2003 | Govrin et al. | |
| 2003/0115128 A1 | 6/2003 | Lange et al. | |
| 2003/0120584 A1 | 6/2003 | Zarefoss et al. | |
| 2003/0140282 A1 | 7/2003 | Kaler | |
| 2003/0208402 A1 | 11/2003 | Bibelnieks et al. | |
| 2003/0216966 A1 | 11/2003 | Saenz et al. | |
| 2003/0220773 A1 | 11/2003 | Haas et al. | |
| 2003/1208402 | 11/2003 | Bibelnieks et al. | |
| 2003/0229536 A1 | 12/2003 | House et al. | |
| 2003/0233278 A1 | 12/2003 | Marshall | |
| 2004/0003400 A1 | 1/2004 | Carney et al. | |
| 2004/0015386 A1 | 1/2004 | Abe et al. | |
| 2004/0039548 A1 | 2/2004 | Selby et al. | |
| 2004/0054572 A1 | 3/2004 | Oldale et al. | |
| 2004/0073496 A1 | 4/2004 | Biernacki | |
| 2004/0078273 A1* | 4/2004 | Loeb et al. | 705/26 |
| 2004/0093296 A1* | 5/2004 | Phelan et al. | 705/36 |
| 2004/0103017 A1* | 5/2004 | Reed et al. | 705/10 |
| 2004/0103051 A1* | 5/2004 | Reed et al. | 705/36 |
| 2004/0225566 A1 | 11/2004 | Beyda et al. | |
| 2005/0021397 A1 | 1/2005 | Cui et al. | |
| 2005/0038893 A1* | 2/2005 | Graham | 709/228 |
| 2005/0043993 A1* | 2/2005 | Stollman et al. | 705/14 |
| 2005/0055275 A1 | 3/2005 | Newman et al. | |
| 2005/0065845 A1 | 3/2005 | DeAngelis | |
| 2005/0071223 A1 | 3/2005 | Jain et al. | |
| 2005/0091077 A1 | 4/2005 | Reynolds | |
| 2005/0096950 A1 | 5/2005 | Caplan et al. | |
| 2005/0137939 A1 | 6/2005 | Calabria et al. | |
| 2005/0144065 A1 | 6/2005 | Calabria et al. | |
| 2005/0153317 A1 | 7/2005 | DeNise et al. | |
| 2005/0154630 A1 | 7/2005 | Lin et al. | |
| 2005/0198157 A1 | 9/2005 | Young et al. | |
| 2005/0216525 A1 | 9/2005 | Wachholz-Prill et al. | |
| 2005/0222906 A1 | 10/2005 | Chen | |
| 2005/0273384 A1 | 12/2005 | Fraser | |
| 2005/0273386 A1 | 12/2005 | Weidner | |
| 2006/0026067 A1 | 2/2006 | Nicholas et al. | |
| 2006/0047563 A1* | 3/2006 | Wardell | 705/10 |
| 2006/0085255 A1 | 4/2006 | Hastings et al. | |
| 2006/0122857 A1 | 6/2006 | DeCotiis et al. | |
| 2006/0149615 A1 | 7/2006 | Andrews et al. | |
| 2006/0161474 A1* | 7/2006 | Diamond et al. | 705/14 |
| 2006/0247973 A1* | 11/2006 | Mueller et al. | 705/14 |
| 2006/0253315 A1 | 11/2006 | Ramsey et al. | |
| 2006/0253318 A1 | 11/2006 | Ramsey et al. | |
| 2006/0253467 A1 | 11/2006 | Ramsey et al. | |
| 2006/0253468 A1 | 11/2006 | Ramsey et al. | |
| 2006/0253469 A1 | 11/2006 | Ramsey et al. | |
| 2008/0021794 A1 | 1/2008 | Vega | |
| 2009/0018891 A1 | 1/2009 | Eder | |

FOREIGN PATENT DOCUMENTS

| | | |
|---|---|---|
| WO | WO 03093930 A2 | 11/2003 |

OTHER PUBLICATIONS

Gonul, Fusun et al., "optimal mailing of catalogs: a new methodology using estimable structural dynamic programming models," management science, vol. 44 No. 9 Sep. 1998 pp. 1249-1262.*

Peter R Dickson, Paul W Farris & Willem J M I Verbeke (2001). Dynamic Strategic Thinking. Academy of Marketing Science. Journal, 29(3), pp. 216-237.

Drury Jenkins. (Aug. 1999). Customer Relationship Management and the Data Warehouse. Call Center Solutions, 18(2), pp. 88-92.

Marla Royne Stafford. (2005). International Services Advertising (ISA): Defining the Domain and Reviewing the Literature. Journal of Advertising, 34(1), pp. 65-86.

Woodside, Arch G. "Modeling Linkage-Advertising: Going Beyond Better Media Comparisons" Journal of Advertising Research; Jul./Aug. 1994, vol. 34 Issue 4, pp. 22-31, 10p.

Shaun Doyle. (2005). Real-time technologies in marketing—Interaction management. Journal of Database Marketing & Customer Strategy Management, 12(3), pp. 272-278.

Honomichl 50: 1998 Business Report on the Marketing Research Industry. (Jun. 1998). 25 pages.

Steven Stern and Douglas Barton. (May/Jun. 1997). Putting the "custom" in customer with database marketing. Strategy & Leadership; 25(3); pp. 46-50.

Portuese, Daniela (2006). E-commerce and the Internet: A study on the impact of relationship marketing opportunities for better online consumer intentional relationship. PhD. dissertation, Capella University, United States—Minnesota.

Kin-Nam Lau, Haily Chow, Connie Liu. "A database approach to cross selling in the banking industry: Practices, Strategies and Challenges." Journal of Database Marketing & Customer Strategy Management; Apr. 2004; 11, 3; ABI/INFORM Global; pp. 216-234.

Serkan Akinci, Safak Aksoy and Eda Atilgan. "Adoption of Internet banking among sophisticated consumer segments in an advanced developing country." The International Journal of Bank Marketing; 2004; 22,2/3; ABI/INFORM Global; pp. 212-232.

Howard Moskowitz, Dorit Cohen, Bert Krieger, Samuel Rabino. "Interest and reaction time analysis of credit card offers: Managerial implications of high level research procedures." Journal of Financial Services Marketing; Dec. 2001; 6,1; ABI/INFORM Global; pp. 172-189.

Gordon A. Wyner. "The Customer Industry." Marketing Management; Jan./Feb. 2002; 11,1; ABI/INFORM Global; pp. 6-7.

Notice of Allowance (Mail Date Nov. 16, 2009) for U.S. Appl. No. 11/120,570, filed May 3, 2005; Confirmation No. 1976.

Notice of Allowance (Mail Date Nov. 20, 2009) for U.S. Appl. No. 11/120,593, filed May 3, 2005; Confirmation No. 4337.

Notice of Allowance (Mail Date Nov. 13, 2009) for U.S. Appl. No. 11/121,234, filed May 3, 2005; Confirmation No. 4311.

* cited by examiner

ON DEMAND SELECTION OF MARKETING OFFERS IN RESPONSE TO INBOUND COMMUNICATIONS

BACKGROUND OF THE INVENTION

1. Technical Field

The present invention relates to a system and associated method for ordering on demand marketing offers for offering to a candidate in response to an inbound communication from the candidate.

2. Related Art

Selling a plurality of services to a customer typically requires a complicated series of steps. Therefore there exists a need for a simple procedure to sell a plurality of services to a customer.

SUMMARY OF THE INVENTION

The present invention provides a database system, comprising:

a first database structure storing a first list identifying marketing offers;

a second database structure storing a second list of candidates; and a database manager software application stored on a computer readable medium, wherein said database manager software application comprises an on demand optimization tool, and wherein said on demand optimization tool is for optimizing and sorting said marketing offers from said first list for a first candidate from said second list in response to an inbound communication from said first candidate.

The present invention provides a selection method, comprising:

providing a database system comprising a database manager software application stored on a computer readable medium, a first database structure storing a first list identifying a plurality of marketing offers, and second database structures storing a second list of candidates, wherein said database manager software application comprises an on demand optimization tool;

optimizing, by said on demand optimization tool, said marketing offers from said first list for a first candidate from said second list in response to an inbound communication from said first candidate; and sorting, by said on demand optimization tool, said marketing offers from said first list for said first candidate from said second list in response to said inbound communication from said first candidate.

The present invention provides process for integrating computing infrastructure, comprising integrating computer-readable code into a computing system, wherein the code in combination with the computing system comprises a database system comprising a database manager software application stored on a computer readable medium, a first database structure storing a first list identifying a plurality of marketing offers, and second database structures storing a second list of candidates, wherein said database manager software application comprises an on demand optimization tool, and wherein the code in combination with the computing system is adapted to implement a method for performing the steps of:

optimizing, by said on demand optimization tool, said marketing offers from said first list for a first candidate from said second list in response to an inbound communication from said first candidate; and sorting, by said on demand optimization tool, said marketing offers from said first list with respect to said first candidate from said second list in response to said inbound communication from said first candidate.

The present invention provides comprising a computer usable medium having a computer readable program code embodied therein, said computer readable program code comprising an algorithm adapted to implement a method for ordering on demand a plurality of marketing offers within a database system, said database system comprising a database manager software application stored on a computer readable medium, a first database structure storing a first list identifying a plurality of marketing offers, and second database structures storing a second list of candidates, wherein said database manager software application comprises an on demand optimization tool, said method comprising the steps of:

optimizing, by said on demand optimization tool, said marketing offers from said first list for a first candidate from said second list in response to an inbound communication from said first candidate; and sorting, by said on demand optimization tool, said marketing offers from said first list for said first candidate from said second list in response to said inbound communication from said first candidate.

The present invention advantageously provides a system and associated method to implement a simple procedure to sell a plurality of services to a customer.

DETAILED DESCRIPTION OF THE INVENTION

Figure 1:
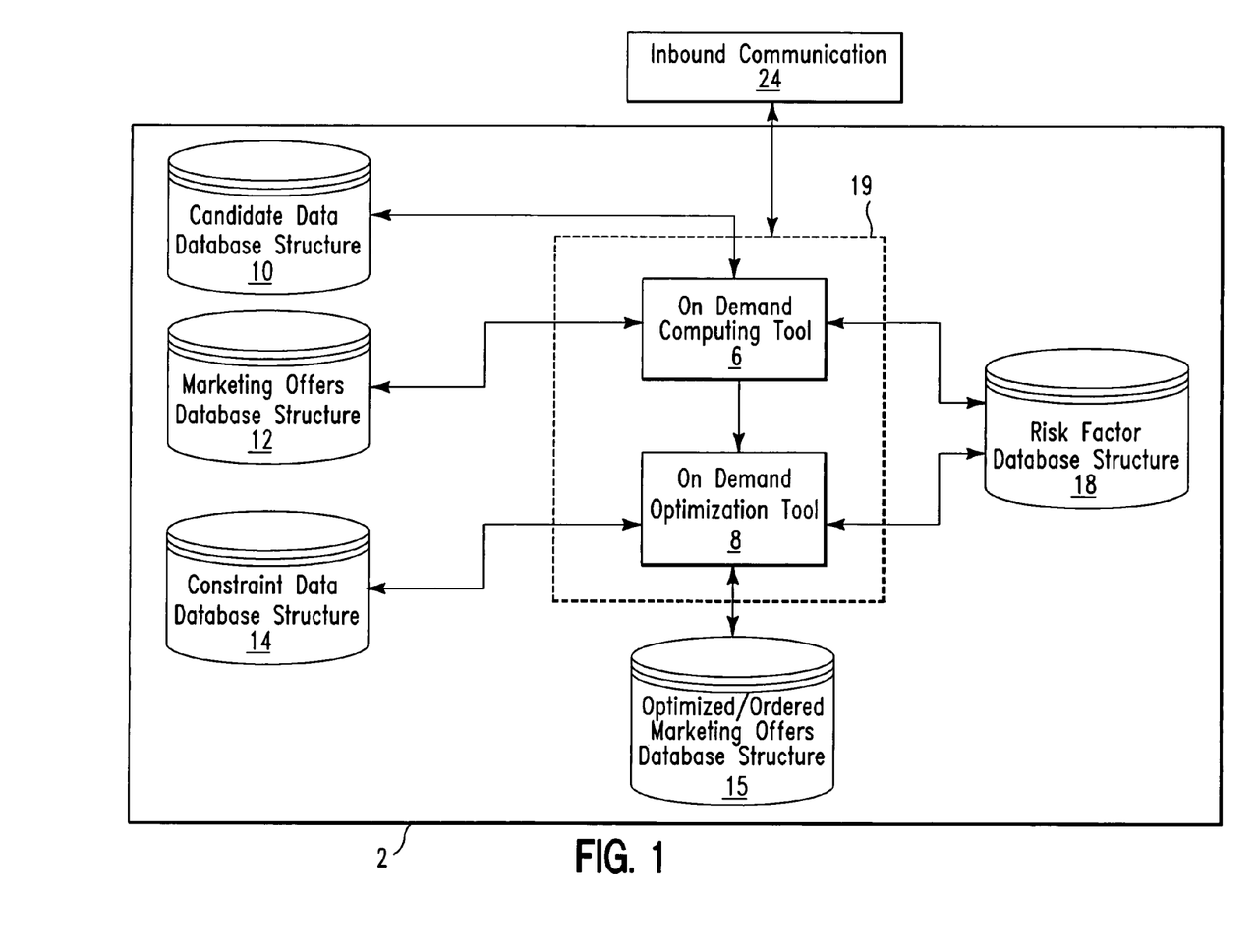
FIG. 1 illustrates a block diagram view of a database system for ordering on demand a plurality of marketing offers for offering to a candidate in response to an inbound communication from the candidate, in accordance with embodiments of the present invention.

FIG. 1 illustrates a block diagram view of a database system 2 for ordering on demand, a list identifying a plurality of marketing offers for offering to a candidate in response to an inbound (i.e., incoming) communication 24 from the candidate, in accordance with embodiments of the present invention. The database system 2 is used by an entity (e.g., a business such as a bank) comprising an existing customer database to sequentially order and optimize marketing offers for offering to candidates from the existing customer database in response to an inbound communication 24 from the candidate. An inbound communication is defined herein as a communication (e.g., a telephone call) initiated by a candidate to an entity. Any communication means may be used by the candidate to contact the entity (i.e., execute an inbound communication) including, inter alia, e-mail, direct mail, text message, telephone, etc. A marketing offer may either comprise a growth (i.e., new marketing offer) marketing offer or a retention (existing product like an existing credit card to be retained) marketing offer. A marketing offer is defined herein as an offer from an entity (e.g., a business) for a product or service to be extended to a customer or potential customer (i.e., candidate). The product or service may comprise an incentive to entice the customer or potential customer to accept the offer. For example, the marketing offer may comprise a credit card offer that will provide an APR that is lower than the normal for a specified period of time as an incentive, such as, inter alia, 1.9% APR for the first 12 months if the credit card is accepted. A candidate may be an existing customer of the entity and a potential customer for the marketing offer. For example, an individual, a business, etc. The database system 2 comprises database structures 10, 12, 14, 15, and 18, and a single database manager software application 19. Each of database structures 10, 12, 14, 15, and 18 may be individual database structures within the database system 2. Alternatively, each of database structures 10, 12, 14, 15, and 18 may be tables or sections within a single database structure (e.g., as illustrated in FIG. 1). The database manager software application 19 is a single database manager software application (i.e., one software application as opposed to multiple software applications). The database manager software application 19 may comprise any type of database management software application including, inter alia, DB2 database management system by IBM, etc. The database manager software application 19 comprises an on demand computing tool 6 and an on demand optimization tool 8. Using a single database manager software application (i.e., database manager software application 19) comprising multiple software components (i.e., on demand computing tool 6 and an on demand optimization tool 8) is advantageous over using a plurality of individual database manager software applications (e.g., a first individual database manager software application comprising a an on demand computing tool and a second individual database manager software application comprising an on demand optimization tool) because communications between components of single database manager software application (e.g., on demand computing tool 6 and on demand optimization tool 8) are faster and more efficient than communications between multiple individual database manager software applications. Communications between components of a single database manager software application are faster and more efficient than communications between multiple individual database manager software applications because data (for manipulation) only has to be moved within a single software application and does not have to be moved from one software application to another software application. Therefore functions performed on the data (e.g., calculations, optimizations, etc) are performed faster and more efficiently by a single database manager software application than by multiple database manager software applications. Database structure 10 comprises customer (i.e., candidate) data including, inter alia, a list of candidates, data models using any customer past history data (e.g., credit card balances, past spending habits, etc.), etc. The customer (i.e., candidate) data comprises information about all of the entity's customers, current or prospective. This data may be compiled from any standard source including, inter alia, an existing marketing database containing data regarding active customers of the entity. The customer data primarily comprises behavioral data (e.g., purchasing history, returned-items history, payment history, etc), promotional (i.e., marketing offers) history (e.g., past marketing offers offered to a candidate including information regarding which marketing offers were accepted by the candidate), and demographic data regarding the candidate. Database structure 10 additionally comprises a predetermined total budget for each candidate regarding an amount of money that the entity offering the marketing offers is willing to spend to offer a plurality of marketing offers to the candidate. Database structure 12 comprises the marketing offers. Database structure 12 additionally comprises a predetermined value score associated with each marketing offer. A value score is a numerical score (e.g., in dollars) representing an expected profit gain to be produced by a marketing offer from a candidate accepting and executing the marketing offer. Database structure 12 additionally comprises drop date data for each of the marketing offers. A drop date is an origin date for offering the marketing offer. Database structure 14 comprises constraint data regarding the marketing offer(s) as applied to a candidate. Constraint data is defined herein as constraints that are associated with offering a marketing offer to a candidate. For example, constraint data may include, inter alia, an amount of money regarding execution costs for offering the marketing offer to a candidate (i.e., an amount that the entity has determined that they are willing is to spend to offer the marketing offer to the candidate), a maximum number of offerings for a marketing offer (e.g., how many times a marketing offer is offered to a candidate), timing between offers, etc. Execution costs may comprise, inter alia, costs for promotional materials, mailing costs, telemarketing costs, infrastructure costs, etc. The computing tool 6 uses data supplied from the database structures 10 and 12 to compute acceptance probability scores and ranking scores for each of the marketing offers with respect to each of the candidates. The acceptance probability scores are for determining a probability that a candidate(s) will respond to and execute each of the marketing offers. In other words, the acceptance probability scores determine a probability that a candidate will respond to and accept a marketing offer within a specified time frame. The acceptance probability scores are calculated using the data models comprising any candidate past history data (e.g., credit card balances, past spending habits, etc.). The ranking score is computed as a function of a value score with respect to a response probability score (e.g., by multiplying a value score for a marketing offer with a response probability score for a candidate). Each ranking score is associated with a marketing offer for a specific candidate. The ranking scores are used to order the marketing offers from highest rank to lowest rank to determine an order in which to offer the plurality of marketing offers to the specific candidate upon an inbound communication 24 from the candidate. The on demand optimization tool 8 sorts the ranking scores (i.e., for the marketing offers) from highest rank to lowest rank for the candidate and a ranking list is created. The on demand optimization tool 8 uses data from the database structure 14 to apply constraint data to each of the ranking scores on the ranking list for a candidate. The on demand optimization tool 8 applies timing constraints to each of the ranking scores for each of the candidates. The timing constraints eliminate any marketing offers that comprise timing conflicts. For example, the on demand optimization tool 8 will take the highest ranked marketing offer (first marketing offer) and compare it to the next highest ranked marketing offer (second marketing offer). If the two marketing offers comprise a same type of marketing offer (e.g., both marketing offers comprise a credit card offer), then the on demand optimization tool looks for a timing conflict. For example if the first marketing offer is to be offered to the candidate every 30 days and the second marketing offer is to be offered every 30 days then the second marketing offer is eliminated from the ranking list because the two marketing offers are same type of marketing offer and should not be received by the candidate at the same time. The on demand optimization tool 8 will continue to apply the timing constraints to each of the marketing offers on the ranking list. Marketing offers comprising timing conflicts are eliminated from the ranking list. The on demand optimization tool 8 then applies monetary constraints to the value scores that remain on the ranking list and subtracts the monetary constraints from the predetermined budgeted execution costs for offering the marketing offer to the candidate. The predetermined budgeted amount comprises an amount of money for execution costs that the entity has determined that they are willing is to spend to offer a plurality of marketing offers to the candidate. For example, each time a marketing offer is offered to a candidate, the execution costs are deducted from the budgeted amount, and once the budget is exceeded, the on demand optimization tool 8 will eliminate any remaining marketing offers from the ranking list. The on demand optimization tool 8 may apply a reason for calling to each of the marketing offers with respect to the candidate. For example, if a candidate calls the entity to transfer fluids from account A to account B, the optimization tool 8 will sort the marketing offers such that a marketing offer comprising an IRA offer will be ranked higher for offering than a marketing offer comprising a homeowners insurance offer. Likewise, if a candidate calls the entity to carry out a mortgage purchase, the optimization tool 8 will sort the marketing offers such that a marketing offer comprising a homeowner's insurance offer will be ranked higher for offering than a marketing offer comprising an IRA offer. The on demand optimization tool 8 may then apply a risk factor to each of the marketing offers with respect to the candidate. A risk factor comprises an evaluated risk (i.e., a variable) that an entity may take on by offering a certain type of marketing offer to a candidate. A risk factor is applied to the ordered marketing offers to eliminate any offers for the candidate that may comprise a risk for an entity (e.g., a business) offering the marketing offers. For example, a candidate may be considered to be a bad risk for a mortgage or home equity loan because of a bad credit report or the candidate may already have a mortgage with a very large balance. The optimization tool 8 creates a final ranking list comprising marketing offers that have not been eliminated due to constraints and/or risks and in a specified order for offering the marketing offers to the associated candidate. The final ranking list comprising the ordered/optimized marketing offers is stored in the database structure 15. The marketing offers from the final ranking list may be offered to the candidate using a same communication means as used by the candidate to execute the inbound communication 24. For example, if a candidate calls (i.e., using a telephone) the entity then the marketing offers from the final ranking list may be offered to the candidate using the telephone during the aforementioned call. Alternatively, the marketing offers from the final ranking list may be offered to the candidate using a different communication means at a different time. Any communication means may be used to offer the marketing offers from the final ranking list to the candidate including, inter alia, e-mail, direct mail, text message, telephone, etc.

Table 1 illustrates an example of sorted ranking scores with constraint data applied and subtracted from the budget.

TABLE 1

| Ranking score | Constraint data | Budget |
|---|---|---|
| $50 | $10 | $30 |
| $40 | $ 5 | $20 |
| $30 | $10 | $15 |
| $20 | $ 5 | $ 5 |
| $10 | $10 | $ 0 |

The first row comprises the highest ranked marketing offer ($50 rank). The total budget is $30 and the associated constraint data is $10. The constraint data ($10) is subtracted from the budget ($30) for the highest ranked marketing offer leaving $20 in the budget for offering more marketing offers to the candidate. The second row comprises the next ranked marketing offer ($40 rank). The constraint data ($5) is subtracted from the budget ($20) for the next ranked marketing offer ($40 rank) leaving $15 in the budget offering more marketing offers to the candidate. The on demand optimization tool goes through each ranked marketing offer until there is no more money left in the budget (see row 5) thereby eliminating any more offerings for marketing offers. The first four rows comprise the marketing offers to be offered sequentially to the candidate. The fifth row comprises an eliminated marketing offer due to an exhausted budget ($0). The marketing offers are offered to the candidate in response to an inbound communication 24 from the candidate.

An example of an implementation for the database system 2 of FIG. 1 for dynamically ordering marketing offers for a candidate in response to an incoming communication from a first candidate is described as follows. This example comprises six marketing offers.

Marketing Offers

1. A Mortgage Offer

2. A Credit Card offer

3. A Household insurance offer

4. An Auto insurance offer

5. A Platinum Credit Card

6. A low rate loan offer

The first candidate calls the entity for a specified reason and based on that reason and/or candidate data the first candidate is scored for each of the 6 marketing offers with propensity to respond (i.e., a acceptance probability score) to each of the marketing offers. All 6 acceptance probability scores are calculated in essentially simultaneously and each score comprises a range between 0 and 1 with 1 comprising the highest propensity to respond to a marketing offer and 0 comprising the lowest propensity to respond to a marketing offer. Each of the marketing offers comprises an expected profit gain (i.e., value score). For example, if the marketing offer is a mortgage offer, the expected profit margin (i.e., value score) may be calculated based on an annual return of repayments vs. infrastructure costs balanced against the risk of the candidate defaulting on the mortgage vs. prepayment of mortgage before the term is up (although the mortgage may be loaded with a prepayment penalty clause to protect a revenue stream). A ranking score for each of the 6 marketing offers is calculated as a function of a value score with for a marketing offer with respect to an acceptance probability score for the associated marketing offer for the first candidate. The aforementioned process is performed by a computing tool (e.g., computing tool 6 in FIG. 1). An optimization tool (e.g., optimization tool 8 in FIG. 1) sorts the 6 marketing offers from highest ranking scores to lowest ranking scores. The optimization tool applies constraint data including timing constraints and monetary constraints (i.e., verses budget) to the 6 marketing offers. The constraint data is applied to the 6 marketing offers starting with the highest ranked marketing offer to the lowest ranking marketing offer and ultimately an optimized execution list is produced comprising a stream of marketing offers that the first candidate will receive. Additionally a reason for calling and a risk factor may be applied to the sorting process. Note that the marketing offers may be ordered and/or optimized without using the ranking scores by just applying the risk factors and/or the reason for calling by the candidate to the marketing offers. As an alternative, the marketing offers may be ordered and optimized for the candidate(s) by the optimization tool 8 in response to the inbound communication without using value scores, response probability scores, and ranking scores. Additionally, the marketing offers may be ordered and optimized by the optimization tool 8 for the candidate(s) in response to the inbound communication using any combination of the value scores, response probability scores, and ranking scores.

Figure 2:
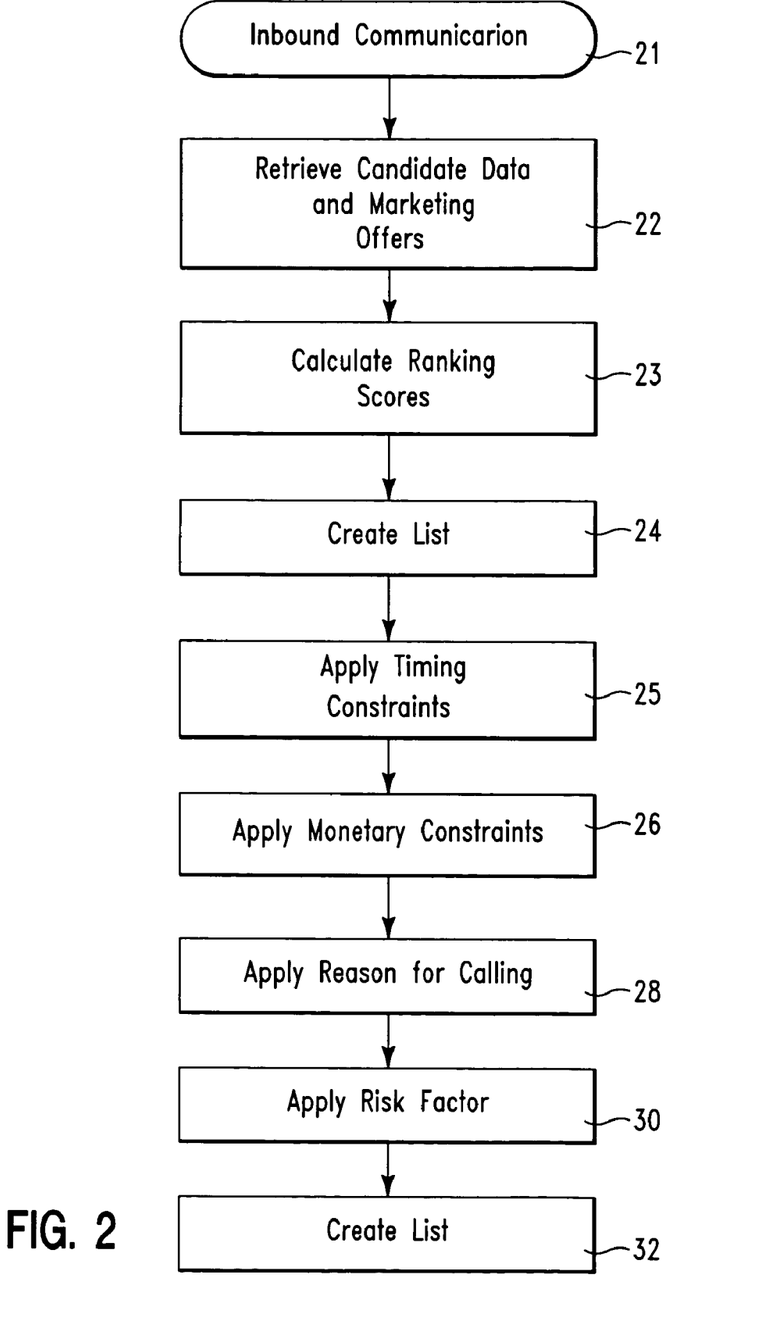
FIG. 2 illustrates a flowchart comprising an algorithm used by database system of FIG. 1 for ordering on demand a plurality of marketing offers for offering to a candidate in response to an inbound communication from the candidate, in accordance with embodiments of the present invention.

FIG. 2 illustrates a flowchart comprising an algorithm used by database system 2 of FIG. 1 for dynamically ordering a plurality of marketing offers for offering to a candidate in response to an inbound communication from the candidate, in accordance with embodiments of the present invention. In step 21, a first candidate calls an entity for a specified reason (e.g., to transfer funds between bank accounts). In step 22, the computing tool 6 retrieves candidate data for the first candidate and marketing offers to offer to the first candidate. In step 23, ranking scores for the marketing offers with respect to the first candidate are calculated by the computing tool 6. In step 24, the optimization tool 8 sorts the ranking scores (i.e., for the marketing offers) from highest rank to lowest rank for the first candidate and a ranking list is created. In step 25, the optimization tool 8 applies timing constraints to each of the ranking scores for the first candidate. The timing constraints eliminate any marketing offers that comprise timing conflicts. In step 26, the optimization tool 8 applies monetary constraints to the value scores that remain after the timing constraints have been applied and subtracts the monetary constraints from the predetermined budgeted execution costs for offering the marketing offer to the first candidate. In step 28, a reason for calling is applied to the marketing offers and the ranking list is reordered accordingly. In step 30, risk factors are applied to the marketing offers. In step 32, a final ranking list is created as a result of execution steps 25, 26, 28, and 30. Note that steps 25, 26, 28, and 30 may be performed in any order. The final ranking list comprises marketing offers that have not been eliminated (i.e., by timing and monetary constraints). The final ranking list comprises a specified order for offering the marketing offers to the first candidate in response to the inbound communication from the first candidate. Ranking a plurality of marketing offers for the first candidate may be done in essentially simultaneously. Additionally, ranking a plurality of marketing offers for a plurality of candidates may be done in essentially simultaneously.

Figure 3:
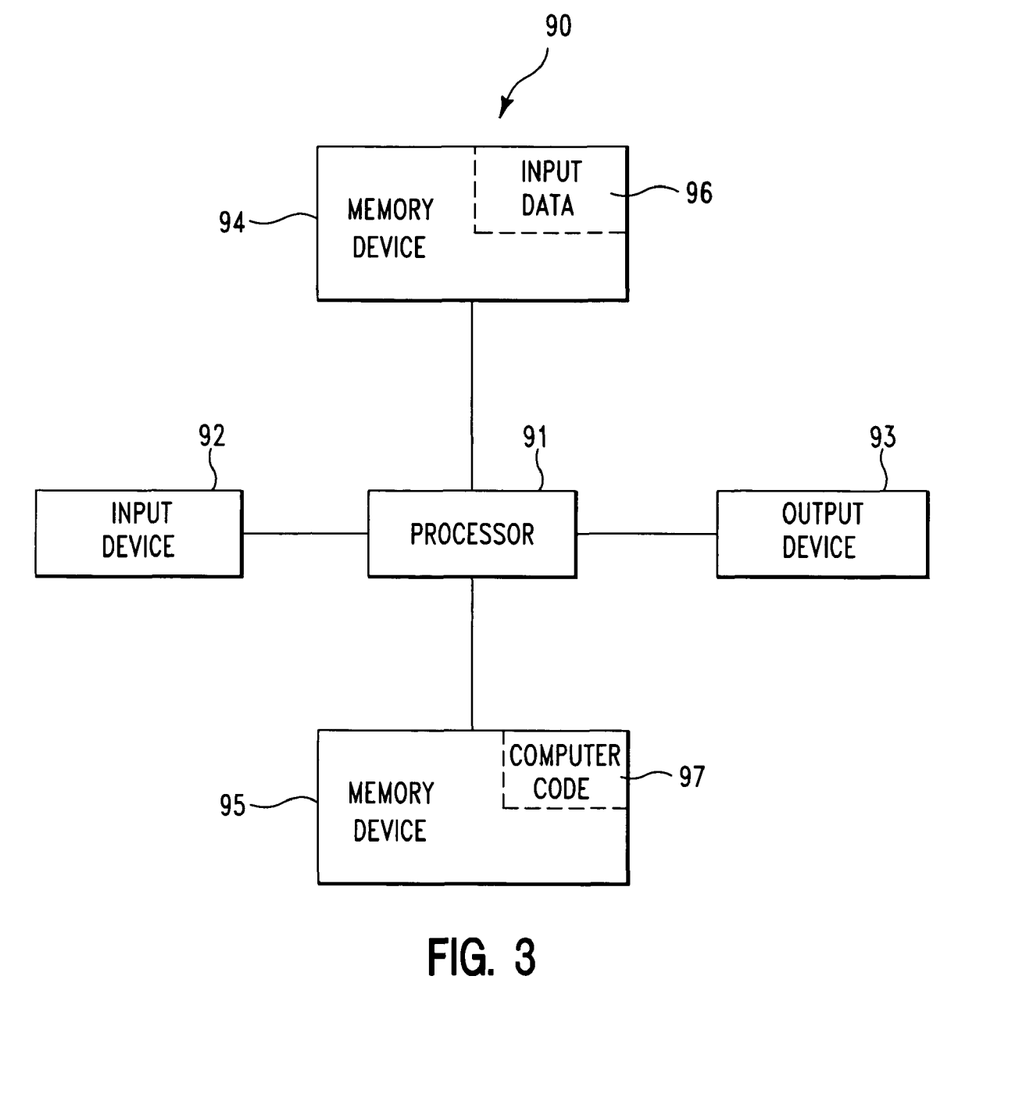
FIG. 3 illustrates a computer system used for implementing the database system for ordering on demand a plurality of marketing offers for offering to a candidate in response to an inbound communication from the candidate, in accordance with embodiments of the present invention.

FIG. 3 illustrates a computer system 90 used for implementing the database system of FIG. 1 for dynamically ordering on demand a plurality of marketing offers for offering to a candidate in response to an inbound communication from the candidate, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for dynamically ordering a plurality of marketing offers for offering to a candidate in response to an inbound communication. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for dynamically ordering a plurality of marketing offers for offering to a candidate.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A database system, comprising a computer processor coupled to a computer-readable memory unit, a database manager software application, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on said computer-readable memory unit, wherein said database manager software application comprises an on demand optimization tool and a computing tool, and wherein each marketing event from said first list comprises a marketing offer consisting of a credit based offer and an identified channel means for communicating said marketing offer, said memory unit comprising instructions that when executed by the computer processor implements a method comprising:

calculating, by said computing tool, value scores associated with said marketing events from said first list, wherein each value score of said value scores is associated with a marketing event from said first list, wherein said value scores are consisting of an expected profit gain associated with each said marketing offer, and wherein each said value score is calculated based on an annual return of credit repayments vs infrastructure costs balanced against a risk of a candidate of said second list of candidates defaulting on said credit repayments;

applying, by said on demand optimization tool, constraint data to said marketing events, wherein said constraint data comprises first data, second data, and third data, wherein said first data consists of an amount of money regarding execution costs for offering said marketing events to a candidate, wherein said second data consists of a total budgeted amount allotted for offering all of said marketing events, wherein said third data comprises a maximum number of times for offering a marketing event of said marketing event to said candidate, and wherein said execution costs comprise costs for promotional materials, mailing costs, and telemarketing costs;

calculating, by said computing tool, acceptance probability scores for said marketing events from said first list for said candidate, wherein each acceptance probability score of said acceptance probability scores is used to determine a probability that said candidate of said second list will respond to and accept said marketing events within a specified time frame, wherein said acceptance probability scores are calculated using said predetermined total budget and said data model, and wherein said acceptance probability scores are computed simultaneously in parallel;

receiving, by said computer processor, an inbound communication initiated by and from said candidate;

receiving, by said computer processor, candidate data associated with said candidate;

calculating, by said computing tool, a ranking score for each of said marketing events with respect to said candidate, wherein said calculating each said ranking score comprises multiplying each said acceptance response probability score with an associated value score of said value scores;

optimizing, by said on demand optimization tool, each said marketing offer from said first list for said candidate from said second list in response to said inbound communication from said candidate;

sorting, by said computer processor executing said on demand optimization tool, each said marketing offer from said first list for said candidate from said second list in response to said inbound communication from said candidate;

generating, by said computer processor in response to said sorting, a ranking list comprising a ranked version of said marketing events and said ranking scores for said candidate;

storing, by said database system, said ranking list;

applying, by said optimization tool, timing constraint data to each ranking score of said ranking scores, wherein said timing constraint data comprises timing related data consisting of a maximum number of offerings for each said marketing event;

removing, by said optimization tool in response to results of said applying said timing constraint data, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to first remaining value scores associated with said first remaining ranking scores, wherein said monetary constraint data consists of an amount of money regarding execution costs for offering said remaining marketing events to said candidate, wherein said execution costs consist of costs for promotional materials, mailing costs, telemarketing costs, and infrastructure costs, and wherein said applying said monetary constraint data comprises subtracting said monetary constraint data from said predetermined total budget;

applying, by said computer processor to said first remaining marketing events, data indicating a reason for said inbound communication from said candidate;

applying, by said computer processor to said first remaining marketing events, risk factors associated with offering said group of marketing events to said candidate, said risk factors associated with a credit report for said candidate;

removing, by said optimization tool in response to results of said applying said monetary constraint data, said data indicating a reason for said inbound communication from said candidate, and said applying said risk factors, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking said second remaining ranking scores; and offering, by said computer processor during said inbound communication, said second remaining marketing events of said final ranking list.

2. The database system of claim 1, wherein each of said acceptance probability scores are computed on demand based on said reason for said inbound communication from said first candidate.

3. The database system of claim 1, wherein said on demand optimization tool is for generating a priority list comprising said sorted marketing offers, and wherein said priority list prioritizes an order in which to offer each of said marketing offers from said first list to said first candidate upon receiving said inbound communication.

4. The database system of claim 1, wherein said on demand optimization tool is for generating a priority list comprising a first group of marketing offers from said sorted marketing offers that fall within a specified set of constraints, and wherein said priority list prioritizes an order in which to offer each of said marketing offers from said first group of marketing offers to said first candidate upon receiving said inbound communication.

5. The database system of claim 1, wherein said second list of candidates comprises existing customers of an entity that is offering said marketing offers from said first list.

6. The database system of claim 1, wherein each marketing offer is selected from the group consisting of a product offer and a service offer.

7. The database system of claim 1, wherein said optimizing and said sorting are based on said reason for said inbound communication from said first candidate.

8. A selection method, comprising:
providing a database system comprising a computer processor coupled to a computer-readable memory unit, a database manager software application, a first database structure storing a first list identifying marketing events, a second database structure storing a second list of candidates, and a third database structure storing a data model consisting of credit card, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on said computer-readable memory unit, wherein said database manager software application comprises an on demand optimization tool and a computing tool, and wherein each marketing event from said first list comprises a marketing offer consisting of a credit based offer and an identified channel means for communicating said marketing offer:

calculating, by said computing tool, value scores associated with said marketing events from said first list, wherein each value score of said value scores is associated with a marketing event from said first list, wherein said value scores are consisting of an expected profit gain associated with each said marketing offer, and wherein each said value score is calculated based on an annual return of credit repayments vs infrastructure costs balanced against a risk of a candidate of said second list of candidates defaulting on said credit repayments;

applying, by said on demand optimization tool, constraint data to said marketing events, wherein said constraint data comprises first data, second data, and third data, wherein said first data consists of an amount of money regarding execution costs for offering said marketing events to a candidate, wherein said second data consists of a total budgeted amount allotted for offering all of said marketing events, wherein said third data comprises a maximum number of times for offering a marketing event of said marketing event to said candidate, and wherein said execution costs comprise costs for promotional materials, mailing costs, and telemarketing costs;

calculating, by said computing tool, acceptance probability scores for said marketing events from said first list for said candidate, wherein each acceptance probability score of said acceptance probability scores is used to determine a probability that a different said candidate of said second list will respond to and accept said marketing events within a specified time frame, wherein said acceptance probability scores are calculated using said predetermined total budget and said data model, and wherein said acceptance probability scores are computed simultaneously in parallel;

receiving, by said computer processor, an inbound communication initiated by and from said candidate;

receiving, by said computer processor, candidate data associated with said candidate;

calculating, by said computing tool, a ranking score for each of said marketing events with respect to said candidate, wherein said calculating each said ranking score comprises multiplying each said acceptance response probability score with an associated value score of said value scores;

optimizing, by said on demand optimization tool, each said marketing offer from said first list for said candidate from said second list in response to said inbound communication from said candidate;

sorting, by said computer processor executing said on demand optimization tool, each said marketing offer from said first list for said candidate from said second list in response to said inbound communication from said candidate;

generating, by said computer processor in response to said sorting, a ranking list comprising a ranked version of said marketing events and said ranking scores for said candidate;

storing, by said database system, said ranking list;

applying, by said optimization tool, timing constraint data to each ranking score of said ranking scores, wherein said timing constraint data comprises timing related data consisting of a maximum number of offerings for each said marketing event;

removing, by said optimization tool in response to results of said applying said timing constraint data, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to first remaining value scores associated with said first remaining ranking scores, wherein said monetary constraint data consists of an amount of money regarding execution costs for offering said remaining marketing events to said candidate, wherein said execution costs consist of costs for promotional materials, mailing costs, telemarketing costs, and infrastructure costs, and wherein said applying said monetary constraint data comprises subtracting said monetary constraint data from said predetermined total budget;

applying, by said computer processor to said first remaining marketing events, data indicating a reason for said inbound communication from said candidate;

applying, by said computer processor to said first remaining marketing events, risk factors associated with offering said group of marketing events to said candidate, said risk factors associated with a credit report for said candidate;

removing, by said optimization tool in response to results of said applying said monetary constraint data, said data indicating a reason for said inbound communication from said candidate, and said applying said risk factors, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking said second remaining ranking scores; and offering, by said computer processor during said inbound communication, said second remaining marketing events of said final ranking list.

9. The method of claim 8, wherein each of said acceptance probability scores are computed on demand based on said reason for said inbound communication from said first candidate.

10. The method of claim 8, further comprising generating by the on demand optimization tool, a priority list comprising said sorted marketing offers, wherein said priority list prioritizes an order in which to offer each of said marketing offers from said first list to said first candidate upon receiving said inbound communication.

11. The method of claim 8, further comprising generating by the on demand optimization tool, a priority list comprising a first group of marketing offers from said sorted marketing offers that fall within a specified set of constraints, wherein said priority list prioritizes an order in which to offer each of said marketing offers from said first group of marketing offers to said first candidate upon receiving said inbound communication.

12. The method of claim 8, wherein said second list of candidates comprises existing customers of an entity that is offering said marketing offers from said first list.

13. The method of claim 8, wherein each marketing offer is selected from the group consisting of a product offer and a service offer.

14. The method of claim 8, wherein said optimizing and said sorting are additionally based on said reason for said inbound communication from said first candidate.

15. A process for integrating computing infrastructure, comprising integrating computer-readable code into a computing system comprising a computer processor, wherein the code in combination with the computing system comprises a database system comprising a database manager software application stored on a computer readable medium, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on said computer-readable memory unit, wherein said database manager software application comprises an on demand optimization tool and a computing tool, and wherein each marketing event from said first list comprises a marketing offer consisting of a credit based offer and an identified channel means for communicating said marketing offer, and wherein the code in combination with the computing system is adapted to implement a method for performing the steps of:

calculating, by said computing tool, value scores associated with said marketing events from said first list, wherein each value score of said value scores is associated with a marketing event from said first list, wherein said value scores are consisting of an expected profit gain associated with each said marketing offer, and wherein each said value score is calculated based on an annual return of credit repayments vs infrastructure costs balanced against a risk of a candidate of said second list of candidates defaulting on said credit repayments;

applying, by said on demand optimization tool, constraint data to said marketing events, wherein said constraint data comprises first data, second data, and third data, wherein said first data consists of an amount of money regarding execution costs for offering said marketing events to a candidate, wherein said second data consists of a total budgeted amount allotted for offering all of said marketing events, wherein said third data comprises a maximum number of times for offering a marketing event of said marketing event to said candidate, and wherein said execution costs comprise costs for promotional materials, mailing costs, and telemarketing costs;

calculating, by said computing tool, acceptance probability scores for said marketing events from said first list for said candidate, wherein each acceptance probability score of said acceptance probability scores is used to determine a probability that said candidate of said second list will respond to and accept said marketing events within a specified time frame, wherein said acceptance probability scores are calculated using said predetermined total budget and said data model, and wherein said acceptance probability scores are computed simultaneously in parallel;

receiving, by said computer processor, an inbound communication initiated by and from said candidate;

receiving, by said computer processor, candidate data associated with said candidate;

calculating, by said computing tool, a ranking score for each of said marketing events with respect to said candidate, wherein said calculating each said ranking score comprises multiplying each said acceptance response probability score with an associated value score of said value scores;

optimizing, by said on demand optimization tool, each said marketing offer from said first list for said candidate from said second list in response to said inbound communication from said candidate;

sorting, by said computer processor executing said on demand optimization tool, each said marketing offer from said first list for said candidate from said second list in response to said inbound communication from said candidate;

generating, by said computer processor in response to said sorting, a ranking list comprising a ranked version of said marketing events and said ranking scores for said candidate;

storing, by said database system, said ranking list;

applying, by said optimization tool, timing constraint data to each ranking score of said ranking scores, wherein said timing constraint data comprises timing related data consisting of a maximum number of offerings for each said marketing event;

removing, by said optimization tool in response to results of said applying said timing constraint data, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to first remaining value scores associated with said first remaining ranking scores, wherein said monetary constraint data consists of an amount of money regarding execution costs for offering said remaining marketing events to said candidate, wherein said execution costs consist of costs for promotional materials, mailing costs, telemarketing costs, and infrastructure costs, and wherein said applying said monetary constraint data comprises subtracting said monetary constraint data from said predetermined total budget;

applying, by said computer processor to said first remaining marketing events, data indicating a reason for said inbound communication from said candidate;

applying, by said computer processor to said first remaining marketing events, risk factors associated with offering said group of marketing events to said candidate, said risk factors associated with a credit report for said candidate;

removing, by said optimization tool in response to results of said applying said monetary constraint data, said data indicating a reason for said inbound communication from said candidate, and said applying said risk factors, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking said second remaining ranking scores; and offering, by said computer processor during said inbound communication, said second remaining marketing events of said final ranking list.

16. The process of claim 15, wherein each of said acceptance probability scores are computed on demand based on said reason for said inbound communication from said first candidate.

17. The process of claim 15, wherein said method further comprises generating by the on demand optimization tool, a priority list comprising said sorted marketing offers, and wherein said priority list prioritizes an order in which to offer each of said marketing offers from said first list to said first candidate upon receiving said inbound communication.

18. The process of claim 15, wherein said method further comprises generating by the on demand optimization tool, a priority list comprising a first group of marketing offers from said sorted marketing offers that fall within a specified set of constraints, wherein said priority list prioritizes an order in which to offer each of said marketing offers from said first group of marketing offers to said first candidate upon receiving said inbound communication.

19. The process of claim 15, wherein said second list of candidates comprises existing customers of an entity that is offering said plurality of marketing offers.

20. The process of claim 15, wherein each marketing offer is selected from the group consisting of a product offer and a service offer.

21. The process of claim 15, wherein said method further comprises optimizing and said sorting said ranking scores additionally based on said reason for said inbound communication from said first candidate.

22. A computer program product, comprising a computer usable medium having a computer readable program code embodied therein, said computer readable program code comprising an algorithm adapted to implement a method within a database system, said database system, comprising a computer processor coupled to a computer-readable memory unit, a database manager software application, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on said computer-readable memory unit, wherein said database manager software application comprises an on demand optimization tool and a computing tool, and wherein each marketing event from said first list comprises a marketing offer consisting of a credit based offer and an identified channel means for communicating said marketing offer, said method comprising the steps of:

calculating, by said computing tool, value scores associated with said marketing events from said first list, wherein each value score of said value scores is associated with a marketing event from said first list, wherein said value scores are consisting of an expected profit gain associated with each said marketing offer, and wherein each said value score is calculated based on an annual return of credit repayments vs infrastructure costs balanced against a risk of a candidate of said second list of candidates defaulting on said credit repayments;

applying, by said on demand optimization tool, constraint data to said marketing events, wherein said constraint data comprises first data, second data, and third data, wherein said first data consists of an amount of money regarding execution costs for offering said marketing events to a candidate, wherein said second data consists of a total budgeted amount allotted for offering all of said marketing events, wherein said third data comprises a maximum number of times for offering a marketing event of said marketing event to said candidate, and wherein said execution costs comprise costs for promotional materials, mailing costs, and telemarketing costs;

calculating, by said computing tool, acceptance probability scores for said marketing events from said first list for said candidate, wherein each acceptance probability score of said acceptance probability scores is used to determine a probability that said candidate of said second list will respond to and accept said marketing events within a specified time frame, wherein said acceptance probability scores are calculated using said predetermined total budget and said data model, and wherein said acceptance probability scores are computed simultaneously in parallel;

receiving, by said computer processor, an inbound communication initiated by and from said candidate;

receiving, by said computer processor, candidate data associated with said candidate;

calculating, by said computing tool, a ranking score for each of said marketing events with respect to said candidate, wherein said calculating each said ranking score comprises multiplying each said acceptance response probability score with an associated value score of said value scores;

optimizing, by said on demand optimization tool, each said marketing offer from said first list for said candidate from said second list in response to said inbound communication from said first candidate;

sorting, by said computer processor executing said on demand optimization tool, each said marketing offer from said first list for said candidate from said second list in response to said inbound communication from said candidates;

generating, by said computer processor in response to said sorting, a ranking list comprising a ranked version of said marketing events and said ranking scores for said candidate;

storing, by said database system, said ranking list;

applying, by said optimization tool, timing constraint data to each ranking score of said ranking scores, wherein said timing constraint data comprises timing related data consisting of a maximum number of offerings for each said marketing event;

removing, by said optimization tool in response to results of said applying said timing constraint data, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to first remaining value scores associated with said first remaining ranking scores, wherein said monetary constraint data consists of an amount of money regarding execution costs for offering said remaining marketing events to said candidate, wherein said execution costs consist of costs for promotional materials, mailing costs, telemarketing costs, and infrastructure costs, and wherein said applying said monetary constraint data comprises subtracting said monetary constraint data from said predetermined total budget;

applying, by said computer processor to said first remaining marketing events, data indicating a reason for said inbound communication from said candidate;

applying, by said computer processor to said first remaining marketing events, risk factors associated with offering said group of marketing events to said candidate, said risk factors associated with a credit report for said candidate;

removing, by said optimization tool in response to results of said applying said monetary constraint data, said data indicating a reason for said inbound communication from said candidate, and said applying said risk factors, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking said second remaining ranking scores; and offering, by said computer processor during said inbound communication, said second remaining marketing events of said final ranking list.

23. The computer program product of claim 22, wherein each of said acceptance probability scores are computed on demand based on said reason for said inbound communication from said first candidate.

24. The computer program product of claim 22, wherein said method further comprises generating by the on demand optimization tool, a priority list comprising said sorted marketing offers, and wherein said priority list prioritizes an order in which to offer each of said marketing offers from said first list to said first candidate upon receiving said inbound communication.

25. The computer program product of claim 22, wherein said method further comprises generating by the on demand optimization tool, a priority list comprising a first group of marketing offers from said sorted marketing offers that fall within a specified set of constraints, wherein said priority list prioritizes an order in which to offer each of said marketing offers from said first group of marketing offers to said first candidate upon receiving said inbound communication.

26. The computer program product of claim 22, wherein said second list of candidates comprises existing customers of an entity that is offering said marketing offers from said first list.

27. The computer program product of claim 22, wherein each marketing offer is selected from the group consisting of a product offer and a service offer.

28. The computer program product of claim 22, wherein said method further comprises optimizing and said sorting said ranking scores additionally based on said reason for said inbound communication from said first candidate.

* * * * *